3,758,310
METHOD OF PRESERVING HOPS
Fritz Briem, Au-Hallertau, Germany, assignor to Marietta
Briem and Zita Binkert, nee Briem
Filed May 8, 1967, Ser. No. 642,279
Claims priority, application Germany, May 6, 1966,
B 87,022, B 87,023; Mar. 30, 1967, B 91,850
The portion of the term of the patent subsequent to
June 11, 1988, has been disclaimed
Int. Cl. C12c 9/02
U.S. Cl. 99—50.5
9 Claims

ABSTRACT OF THE DISCLOSURE

Hops can be stored for a long period of time by drying and crushing freshly picked hops, and sealing the crushed hops in an air-tight film envelope which has an atmosphere consisting essentially of a carbon dioxide-nitrogen mixture.

---

It is known in the art to dry freshly harvested hops to a moisture content of about 10 to 15 weight percent and to store such dried hops for future use. During such storage, hops are known to lose large proportions of their flavoring and aroma imparting substances and thus to have their value for use in brewing beer substantially reduced.

Attempts have been made to reduce the loss of flavoring and aroma imparting substances by vacuum packing dried, crushed hops. It has been found, however that such practices have not proven sufficiently helpful and that hops so packaged have a very limited shelf life and lose a part of their flavoring and aroma imparting substances within a short time.

It is therefore an object of this invention to provide a novel drying and packaging technique for hops.

It is another object of this invention to provide a novel dried hops package

Other and additional objects of this invention will become apparent from a consideration of this entire specification, including the claims hereof.

In accord with and fulfilling these objects, one aspect of this invention resides in a hops package comprising a substantially airtight film envelope containing therein dried, crushed hops and an atmosphere consisting essentially of carbon dioxide and nitrogen.

Another aspect of this invention comprises a process wherein freshly picked hops are crushed, dried and packed in an airtight film envelope. The package is provided with a sub-atmospheric pressure atmosphere of carbon dioxide and nitrogen and then sealed.

According to this invention, the hops may be crushed to any particular particle size. However, it has been found that the best long term shelf life with the least loss of valuable brewing components is obtained if the hops are ground to particles of about 2 to 12 millimeters, and preferably to about 2 to 6 millimeters. It has been found that if the hops are ground finer than this value, such as, for example, by pulverization, as described in the magazine, This opinion has, however, proven to be unfounded since "Brauwelt," 1965, page 761, evacuation of the package is rendered difficult, and important quantities of flavoring substances are lost.

If the crushing is effected to a particle size of about 2 to 12 mm., the crushing process takes place more easily since the mass is not sticky and, therefore, passes more easily through the mill. Furthermore, the soft resins remain in the product and do not dirty the mill, as is the case with smaller particle sizes.

In accord with a preferred aspect of this invention, it has been found that, while drying to a moisture content of about 10 to 15 weight percent, as known in the art, may be satisfactory for relatively short shelf life applications, it is preferred to retain an even smaller water content, down to about 6 to 8 weight percent, and especially about 6 weight percent water, for greatly increased flavor preservation. Hops dried to this preferred low moisture content have been found to facilitate beer production.

Evacuation of the hops package is facilitated if the dried and crushed hops are not evacuated in loose form, but rather, in the form of cubes, discs or similar shaped bodies. In this way, the formation of an excessively large amount of dust upon the evacuation is avoided and, in addition, the advantage is obtained that cubes or discs of equal weight can be produced so that the measuring out of the required quantity of hops for the production of the beer is simplified.

When using the aforementioned durably-packed hops, no brewing values are lost. One can, as desired, have available packages of hops of the desired size, for instance, 5, 10, 12.5, or more kg. per package.

A further advantage is obtained according to this invention in beer production. It has been the general practice in making beer to separately boil the malt and hops. Hops prepared according to this invention can be advantageously boiled directly with the malt, thus providing an economic advantage. A further economic advantage is obtained by the joint boiling since the spent hops-containing grain can be used in its entirety as a cattle feed. This was not possible in the case of hops which were boiled separately. In order to use the spent hops for this purpose, it was previously believed that the particle size should not be larger than 6 mm. since it was thought that the animal would refuse spent hops of larger particle size. This opening has, however, proven to be unfounded since even spent grain of a particle size of 12 mm. and more are relished by cattle.

The compressed hops prepared according to this invention are readily soluble and do not result in any disturbance in beer making. They facilitate the clarifying of the beer wort and thereby shorten the time. Furthermore, the quantity of the spent grains is increased and the spent hops can be sold profitably with the rest of the spent grains.

In general, by means of the new method, space is saved in the brewery and a cooling of the packed hops in a separate cooling cellar is unnecessary since the packed hops can be stored at ordinary temperature.

While the proportion of carbon dioxide and nitrogen in the atmosphere of the dried hops package may range over wide values, a convenient atmosphere which is suitable for this use consists essentially of about ⅔ nitrogen and about ⅓ carbon dioxide; thus, the ratio of nitrogen to carbon dioxide which is preferred is about 2 to 1.

Substantially any film envelope which is substantially air-tight and is substantially inert with respect to the hops packaged therein and to the atmosphere of the package is suitable for use in this invention. Metal foils, particularly aluminum, have been found to be eminently suited to use as packaging materials. Various plastic films are also suited to use herein. The film packages may be welded or heat-sealed to close them; e.g., by RF or electro-welding.

What is claimed is:

1. Packaged hops comprising a substantially air-tight film envelope having a carbon dioxide-nitrogen atmosphere consisting essentially of nitrogen and carbon dioxide in about a 2 to 1 volume ratio, and dried, crushed hops therein.

2. Packaged hops as claimed in claim 1 wherein said hops have a moisture content of about 6 to 8 weight percent.

3. Packaged hops as claimed in claim 1 wherein said hops have a moisture content of about 6 weight percent.

4. Packaged hops as claimed in claim 1 wherein said hops have a particle size of about 2 to 12 mm.

5. Packaged hops as claimed in claim 1 wherein said hops have a particle size of about 2 to 6 mm.

6. Packaged hops as claimed in claim 1 wherein said film is aluminum foil.

7. Method of producing packaged hops as claimed in claim 1 comprising drying and crushing freshly picked hops; packaging such in a substantially air-tight film envelope; providing a vacuum in said package; providing a carbon dioxide-nitrogen atmosphere consisting essentially of nitrogen and carbon dioxide in about a 2 to 1 volume ratio in said package; and hermetically sealing said package.

8. Method as claimed in claim 7 wherein the pressure in said envelope is about one-half atmosphere.

9. In the method of producing beer which includes boiling malt and boiling hops; the improvement which comprises directly boiling a mixture of malt and hops, which hops have been packaged as claimed in claim 7, having a moisture content of about 6 to 8 weight percent together and separating spent hops and spent malt together from the wort.

References Cited
UNITED STATES PATENTS

| | | | |
|---|---|---|---|
| 2,925,346 | 2/1960 | Harper et al. | 99—189 X |
| 3,048,489 | 8/1962 | Blum | 99—51 |
| 3,255,020 | 6/1966 | Ferrell | 99—189 |
| 3,442,657 | 5/1969 | Bonnet et al. | 99—50.5 |

FOREIGN PATENTS

Hind, H. L., Breming, Science and Practice, Chapman & Hall, London 1950, vol. 1 (pp. 344–345), TP 570H55C.2.

DAVID M. NAFF, Primary Examiner

U.S. Cl. X.R.

99—31, 52, 189